United States Patent
Afifi et al.

(10) Patent No.: US 11,849,264 B2
(45) Date of Patent: Dec. 19, 2023

(54) APPARATUS AND METHOD FOR WHITE BALANCE EDITING

(71) Applicant: SAMSUNG ELECTRONICS CO., LTD., Suwon-si (KR)

(72) Inventors: Mahmoud Nasser Mohammed Afifi, Toronto (CA); Michael Scott Brown, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/077,837

(22) Filed: Oct. 22, 2020

(65) Prior Publication Data

US 2021/0160470 A1 May 27, 2021

Related U.S. Application Data

(60) Provisional application No. 62/939,286, filed on Nov. 22, 2019.

(51) Int. Cl.
*G06T 5/00* (2006.01)
*H04N 9/73* (2023.01)
(Continued)

(52) U.S. Cl.
CPC ............... *H04N 9/73* (2013.01); *G06T 3/40* (2013.01); *G06T 5/50* (2013.01); *G06F 3/04847* (2013.01);
(Continued)

(58) Field of Classification Search
CPC .......... H04N 9/73; H04N 1/60; H04N 1/6077; G06T 2207/20084; G06T 2207/10024;
(Continued)

(56) References Cited

U.S. PATENT DOCUMENTS 10,713,816 B2\* 7/2020 Hu .................. G06N 3/084
2004/0126012 A1 7/2004 Sakaida
(Continued)

FOREIGN PATENT DOCUMENTS

CN 109348206 A 2/2019
KR 10-2018-0116574 A 10/2018
(Continued)

OTHER PUBLICATIONS

Afifi, Mahmoud, et al. "When color constancy goes wrong: Correcting improperly white-balanced images." Proceedings of the IEEE/CVF conference on computer vision and pattern recognition. 2019.*
(Continued)

*Primary Examiner* — Li Liu
(74) *Attorney, Agent, or Firm* — Sughrue Mion, PLLC

(57) ABSTRACT

An apparatus for white balance editing, includes a memory storing instructions, and at least one processor configured to execute the instructions to obtain an input image having an original white balance that is corrected by image signal processing, and obtain, using a first neural network, an intermediate representation of the obtained input image, the intermediate representation having the original white balance that is not corrected by the image signal processing. The at least one processor is further configured to execute the instructions to obtain, using a second neural network, a first output image having a first white balance different than the original white balance, based on the obtained intermediate representation.

20 Claims, 10 Drawing Sheets

(51) Int. Cl.
   *G06T 5/50*       (2006.01)
   *G06T 3/40*       (2006.01)
   *G06F 3/04847*    (2022.01)
(52) U.S. Cl.
   CPC .............................. *G06T 2200/24* (2013.01);
   *G06T 2207/10024* (2013.01); *G06T 2207/20084* (2013.01)
(58) Field of Classification Search
   CPC ...... G06T 2207/20081; G06T 2200/24; G06N 3/0454; G06V 10/56
   See application file for complete search history.

(56) References Cited

U.S. PATENT DOCUMENTS

| | | | |
|---|---|---|---|
| 2008/0062273 A1 | 3/2008 | Okamoto et al. | |
| 2009/0067711 A1 | 3/2009 | Sasaki | |
| 2013/0083216 A1 | 4/2013 | Jiang et al. | |
| 2014/0241620 A1* | 8/2014 | Zhang | H04N 9/735 382/165 |
| 2015/0310794 A1 | 10/2015 | Gille et al. | |
| 2016/0284095 A1 | 9/2016 | Chalom et al. | |
| 2019/0045163 A1 | 2/2019 | Nikkanen et al. | |
| 2019/0132563 A1 | 5/2019 | Wang | |
| 2020/0389635 A1* | 12/2020 | Afifi | H04N 9/73 |

FOREIGN PATENT DOCUMENTS

| | | | |
|---|---|---|---|
| KR | 10-2019-0037842 A | 4/2019 | |
| KR | 10-2019-0064958 A | 6/2019 | |
| WO | WO-2020206539 A1 * | 10/2020 | ............... G06T 3/40 |

OTHER PUBLICATIONS

Communication dated Jan. 31, 2022 issued by the Korean Intellectual Property Office in application No. 10-2020-0149896.
International Search Report (PCT/ISA/210) and Written Opinion (PCT/ISA/237) dated Jan. 29, 2021 issued by the International Searching Authority in International Application No. PCT/KR2020/015799.
Communication dated Dec. 5, 2022 by the European Patent Office for European Patent Application No. 20889398.2.
Communication dated Mar. 14, 2023 issued by the European Patent Office in Application No. 20889398.2.
Extended European Search Report dated Mar. 30, 2023 in European Patent Application No. 23158058.0.
Mahmoud Afifi et al., "Deep White-Balance Editing", 2020 IEEE/CVF Conference on Computer Vision and Pattern Recognition (CVRP), 2020, XP033804737, pp. 1394-1403 (10 pages total).

* cited by examiner

APPARATUS AND METHOD FOR WHITE BALANCE EDITING

CROSS-REFERENCE TO RELATED APPLICATION

This application claims priority under 35 U.S.C. § 119 from U.S. Provisional Application No. 62/939,286 filed on Nov. 22, 2019, in the U.S. Patent & Trademark Office, the disclosure of which is incorporated herein by reference in its entirety.

FIELD

Methods and apparatuses consistent with embodiments relate to white balance editing.

BACKGROUND

White balance (WB) is a low-level computer vision task applied to all camera images. WB is performed so that scene objects appear as the same color even when imaged under different illumination conditions. Conceptually, WB is intended to normalize the effect of the captured scene's illumination such that all objects appear as if they were captured under ideal "white light." WB is one of the first color manipulation steps applied to the sensor's unprocessed raw-RGB image by the camera's onboard integrated signal processor (ISP). After WB is performed, a number of additional color rendering steps are applied by the ISP to further process the raw-RGB image to its final standard RGB (sRGB) encoding.

While the goal of WB is intended to normalize the effect of the scene's illumination, ISPs often incorporate aesthetic considerations in their color rendering based on photographic preferences. Such preferences do not always conform to the white light assumption and can vary based on different factors, such as cultural preference and scene content.

Most digital cameras provide an option to adjust the WB settings during image capturing. However, once the WB setting has been selected and the image is fully processed by the ISP to its final sRGB encoding, it becomes challenging to perform WB editing without access to the original unprocessed raw-RGB image. This problem becomes even more difficult if the WB setting was wrong, which results in a strong color cast in the final sRGB image.

The ability to edit the WB of an sRGB image is not only useful from a photographic perspective but can be beneficial for computer vision and image processing applications, such as object recognition, scene understanding, and color augmentation. A recent study showed that images captured with an incorrect WB setting produce a similar effect of an untargeted adversarial attack for deep neural network (DNN) models.

SUMMARY

Embodiments provide a method and an apparatus for white balance editing.

According to an aspect of the disclosure, there is provided an apparatus for white balance editing, the apparatus including a memory storing instructions, and at least one processor configured to execute the instructions to obtain an input image having an original white balance that is corrected by image signal processing, and obtain, using a first neural network, an intermediate representation of the obtained input image, the intermediate representation having the original white balance that is not corrected by the image signal processing. The at least one processor is further configured to executed the instructions to obtain, using a second neural network, a first output image having a first white balance different than the original white balance, based on the obtained intermediate representation.

According to an aspect of the disclosure, there is provided a method of white balance editing, the method being performed by at least one processor and including obtaining an input image having an original white balance that is corrected by image signal processing, and obtaining, using a first neural network, an intermediate representation of the obtained input image, the intermediate representation having the original white balance that is not corrected by the image signal processing. The method further includes obtaining, using a second neural network, a first output image having a first white balance different than the original white balance, based on the obtained intermediate representation.

According to an aspect of the disclosure, there is provided a non-transitory computer-readable storage medium storing instructions that, when executed by at least one processor for white balance editing, cause the at least one processor to obtain an input image having an original white balance that is corrected by image signal processing, and obtain, using a first neural network, an intermediate representation of the obtained input image, the intermediate representation having the original white balance that is not corrected by the image signal processing. The instructions further cause the at least one processor to obtain, using a second neural network, a first output image having a first white balance different than the original white balance, based on the obtained intermediate representation.

While the afore-described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Figure 1:
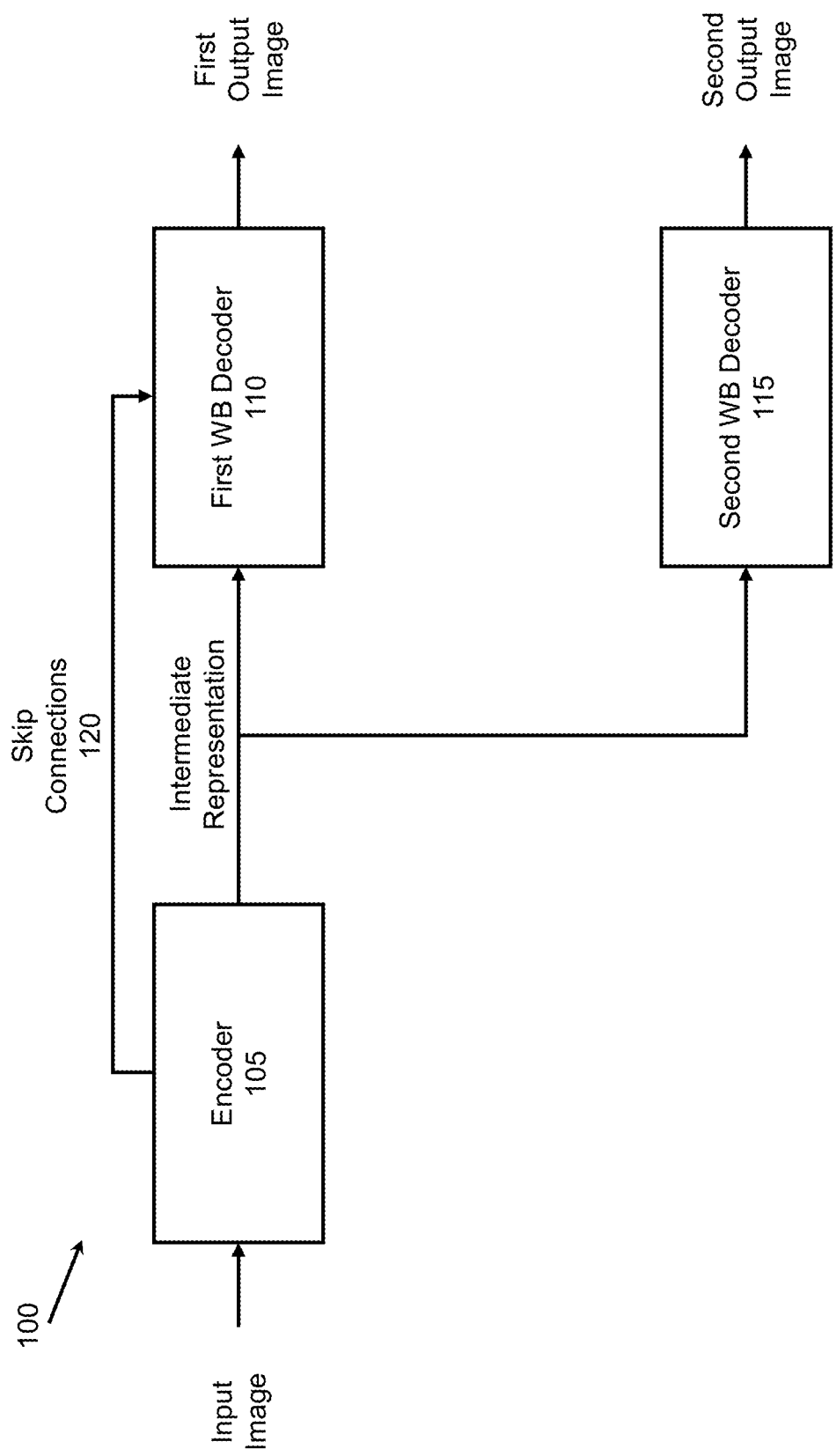
FIG. 1 is a block diagram of an apparatus for white balance editing, according to embodiments.

Embodiments of the present disclosure provide a method and an apparatus for white balance editing.

In detail, a deep learning approach to realistically edit an sRGB image's white balance is introduced. Cameras capture sensor images that are rendered by their ISP(s) to an sRGB color space encoding. The ISP rendering begins with a white balance procedure that is used to remove a color cast of a scene's illumination. An ISP then applies a series of nonlinear color manipulations to enhance a visual quality of the final sRGB image. Recent work showed that sRGB images that were rendered with incorrect white balances cannot be easily corrected due to an ISP's nonlinear rendering. The work proposed a KNN solution based on tens of thousands of image pairs. However, because an ISP may incorrectly correct a WB of an image early in its processes, such an error may be propagated throughout its processes, even in the KNN solution.

The embodiments solve this problem with a DNN architecture trained in an end-to-end manner to learn a correct white balance. The DNN architecture maps an input image to two additional white balance settings corresponding to indoor and outdoor illuminations. The embodiments are not only more accurate than the KNN approach in terms of the correcting a wrong white balance setting, but also provide a user the freedom to edit a white balance in an sRGB image to other illumination settings.

The embodiments present a deep learning framework that allows realistic post-capture WB editing of sRGB images. The framework includes a single encoder network that is coupled with three decoder networks targeting the following WB settings: (1) a "correct" AWB setting; (2) an indoor WB setting; and (3) an outdoor WB setting. The first decoder allows an sRGB image that has been incorrectly white-balanced to be edited to have a correct WB. This is useful for a task of post-capture WB correction. The additional indoor and outdoor decoders provide users an ability to produce a wide-range of different WB appearances by blending between two outputs of the decoders. This supports photographic editing tasks to adjust an image's aesthetic WB properties. The framework generalizes well to images outside training data and achieves state-of-the-art results for the above-discussed tasks.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, each element described hereinafter may additionally perform some or all of functions performed by another element, in addition to main functions of itself, and some of the main functions of each element may be performed entirely by another component.

In the present specification, an 'image' may denote a still image, a moving image including a plurality of consecutive still images (or frames), or a video. The image may be a two-dimensional (2D) image or a three-dimensional (3D) image.

Further, in the present specification, a neural network is a representative example of an artificial intelligence model, but embodiments are not limited to an artificial intelligence model using an algorithm.

Furthermore, in the present specification, a 'parameter' or a 'neural network parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a diagram of an apparatus 100 for white balance editing, according to embodiments.

Referring to FIG. 1, the apparatus 100 includes an encoder 105, a first WB decoder 110 and a second WB decoder 115.

The apparatus 100 may be implemented in an electronic device (e.g., a mobile device) and/or a server.

The encoder 105 is configured to obtain (receive) an input image (e.g., an sRGB image) having an original white balance that is corrected by image signal processing of an ISP of a camera. The encoder 105 is further configured to obtain and transmit an intermediate representation of the obtained input image, the intermediate representation having the original white balance that is not corrected by the image signal processing. The encoder 105 includes a neural network, such as, for example, a convolutional neural network (CNN) or DNN, which will be described in FIG. 2 below.

The first WB decoder 110 is configured to obtain and transmit a first output image having a first white balance different than the original white balance, based on the obtained intermediate representation. The first WB decoder 110 includes a neural network, such as, for example, a CNN or DNN, which will be described in FIG. 3 below. The first white balance may be, for example, an AWB The second WB decoder 115 is configured to obtain a second output image having a second white balance different than the original white balance and the first white balance, based on the obtained intermediate representation. The second WB decoder 115 includes a neural network, such as, for example, a CNN or DNN, which will be described in FIG. 4 below. The second white balance may be, for example, a shade WB or an incandescent WB that are correlated to 2850 Kelvin (K) and 7500 K color temperatures, respectively.

In detail, given an input sRGB image $I_{WB_{(in)}}$ that is rendered through an unknown camera ISP with an arbitrary WB setting $WB_{(in)}$, the goal is to edit colors of the input sRGB image $I_{WB_{(in)}}$ to appear as if it is re-rendered with a target WB setting $WB_{(t)}$.

The above task can be accomplished accurately if an original unprocessed raw-RGB image is available. If unprocessed raw-RGB values could be recovered, the arbitrary WB setting $WB_{(in)}$ can be changed to the target WB setting $WB_{(t)}$, and then the sRGB image can be re-rendered back to an sRGB color space with a software-based ISP. This process can be described by the following equation:

$$I_{WB_{(t)}} = G \circ F(I_{WB_{(in)}}) \quad (1).$$

$F: I_{WB_{(in)}} \to D_{WB_{(in)}}$ is an unknown reconstruction function that reverses the camera-rendered sRGB image I back to its corresponding raw-RGB image D with the arbitrary WB setting $WB_{(in)}$ applied. $G: D_{WB_{(in)}} \to I_{WB_{(t)}}$ is an unknown camera rendering function that is responsible for editing the arbitrary WB setting $WB_{(in)}$ and re-rendering a final sRGB image $I_{WB_{(t)}}$. The symbol $\circ$ denotes a function composition.

The goal is to model the functionality of G F to generate the final sRGB image $I_{WB_{(t)}}$. First, it is analyzed how the functions G and F cooperate to produce the final sRGB image $I_{WB_{(t)}}$. From Equation (1), the function F transforms the input sRGB image $I_{WB_{(in)}}$ into an intermediate representation (i.e., the raw-RGB image D with a captured WB setting), while the function G accepts this intermediate representation and renders it with the target WB setting $WB_{(t)}$ to an sRGB color space encoding.

Due to nonlinearities applied by an ISP's rendering chain, the function G can be thought of as a hybrid function that includes a set of sub-functions, and each sub-function is responsible for rendering the intermediate representation with a specific WB setting.

The goal is not to reconstruct/re-render original raw-RGB values, but rather to generate the final sRGB image $I_{WB_{(t)}}$ with the target WB setting $WB_{(t)}$. Therefore, the functionality of G∘F can be modeled as an encoder/decoder scheme. An encoder $f$ (i.e., the encoder 105 of FIG. 1) transfers the input sRGB image $I_{WB_{(in)}}$ into a latent representation, while each of decoders $g_1, g_2, \ldots$ (i.e., the first and second WB decoders 110 and 115) generates final sRGB images with different WB settings. Similar to Equation (1), a framework can be formulated as follows:

$$\hat{I}_{WB_{(t)}} = g_t \circ f(I_{WB_{(in)}}) \quad (2).$$

$f: I_{WB_{(in)}} \to Z$, $g_t: Z \to \hat{I}_{WB_{(t)}}$, and Z is an intermediate representation (i.e., the latent representation) of the original input sRGB image $I_{WB_{(in)}}$.

The goal is to make the functions $f$ and $g_t$ independent, such that changing the function $g_t$ with a new function $g_y$ that targets a different WB setting $WB_y$, does not require any modification in the function $f$, as it is the case in Equation (1).

In embodiments, three different WB settings are targeted: (i) $WB_{(A)}$: AWB—representing correct lighting of a captured image's scene; (ii) $WB_{(T)}$: Tungsten/incandescent—representing a WB for indoor lighting; and (iii) $WB_{(S)}$: shade—representing a WB for outdoor lighting. This gives rise to three different decoders $g_A$, $g_T$ and $g_S$ that are responsible for generating output images respectively corresponding to an AWB, an incandescent WB, and a shade WB.

The incandescent and shade WBs are selected based on color properties. This can be understood when considering illuminations in terms of their correlated color temperatures. For example, incandescent and shade WB settings are correlated to 2850 K and 7500 K color temperatures, respectively. This wide range of illumination color temperatures is considered a range of pleasing illuminations. Moreover, the wide color temperature range between incandescent and shade WBs allow approximation of images with color temperatures within this range by interpolation. Details of this interpolation process are explained in FIG. 9 below. There is no fixed correlated color temperature for the AWB mode, as it changes based on an input image's lighting conditions.

Referring again to FIG. 1, an overview of a DNNs' architecture is shown. A U-Net architecture may be used with multi-scale skip connections 120 between the encoder 105 and the first and second WB decoders 110 and 115. A framework includes two main units. The first is the encoder 105, a 4-level encoder unit that is responsible for extracting a multi-scale latent representation (the intermediate representation) of the input image. The second unit includes at least two 4-level decoders (e.g., the first and second WB decoders 110 and 115). Each unit has a different bottleneck and upsampling component. At a first level of the encoder 105 and a last level of each of the first and second WB decoders 110 and 115, each convolutional layer has 24 channels. For each subsequent or prior level, a number of channels is doubled (e.g., a third level of the encoder 105 has 192 channels for each convolutional layer).

Figure 2:
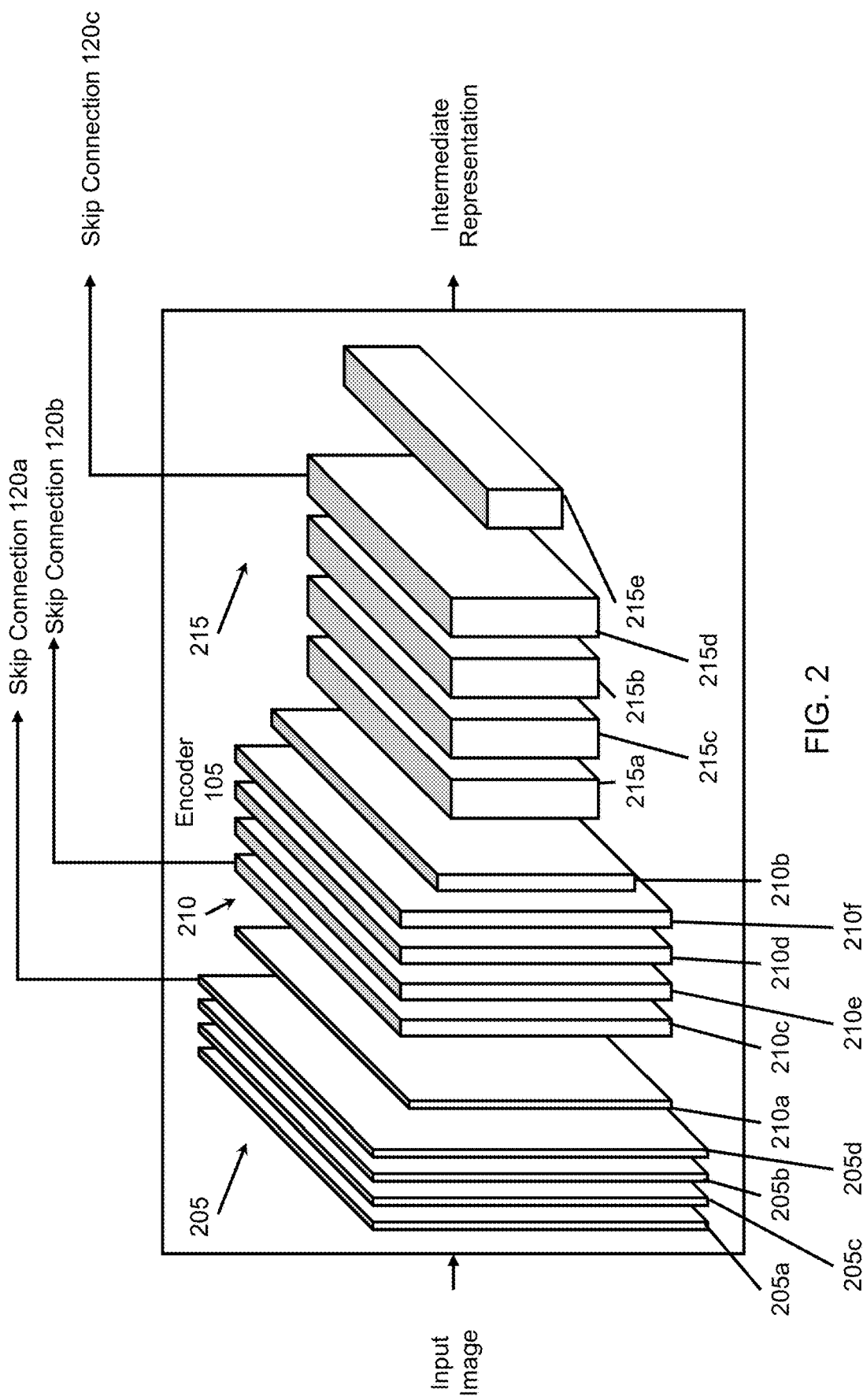
FIG. 2 is a block diagram of an encoder of the apparatus for white balance editing of FIG. 1.

FIG. 2 is a block diagram of the encoder 105 of the apparatus 100 for white balance editing of FIG. 1.

Referring to FIG. 2, the encoder 105 may include a first level 205, a second level 210 and a third level 215. The input image may be transferred through each of layers of the first level 205, the second level 210 and the third level 215 to obtain the intermediate representation that is output to the first WB decoder 110 and/or the second WB decoder 115.

The first level 205 may include 3×3 convolutional layers 205a and 205b with stride 1 and padding 1, and rectified linear unit (ReLU) layers 205c and 205d. The ReLU layer 205c may be interposed between the convolutional layers 205a and 205b, and the convolutional layer 205b may be interposed between the ReLU layers 205c and 205d. For example, each of the convolutional layers 205a and 205b and the ReLU layers 205c and 205d may have a size of 128×128×24.

The second level 210 may include 2×2 max-pooling layers 210a and 210b with stride 2, 3×3 convolutional layers 210c and 210d with stride 1 and padding 1, and ReLU layers 210e and 210f. The ReLU layer 210e may be interposed between the convolutional layers 210c and 210d, the convolutional layer 210d may be interposed between the ReLU layers 210e and 210f, and the convolutional layers 210c and 210d and the ReLU layers 210e and 210f may be interposed between the max-pooling layers 210a and 210b. For example, each of the convolutional layers 210c and 210d and the ReLU layers 210e and 210f may have a size of 64×64×48, the max-pooling layer 210a may have a size of 64×64×24, and the max-pooling layer 210b may have a size of 32×32×48.

The third level 215 may include 3×3 convolutional layers 215a and 215b with stride 1 and padding 1, ReLU layers 215c and 215d, and a 2×2 max-pooling layer 215e with stride 2. The ReLU layer 215c may be interposed between the convolutional layers 215a and 215b, the convolutional layer 215b may be interposed between the ReLU layers 215c and 215d, and the max-pooling layer 215e may be disposed after the convolutional layers 215a and 215b and the ReLU layers 215c and 215d. For example, each of the convolutional layers 215a and 215b and the ReLU layers 215c and 215d may have a size of 16×16×192, and the max-pooling layer 215e may have a size of 8×8×192.

Figure 3:
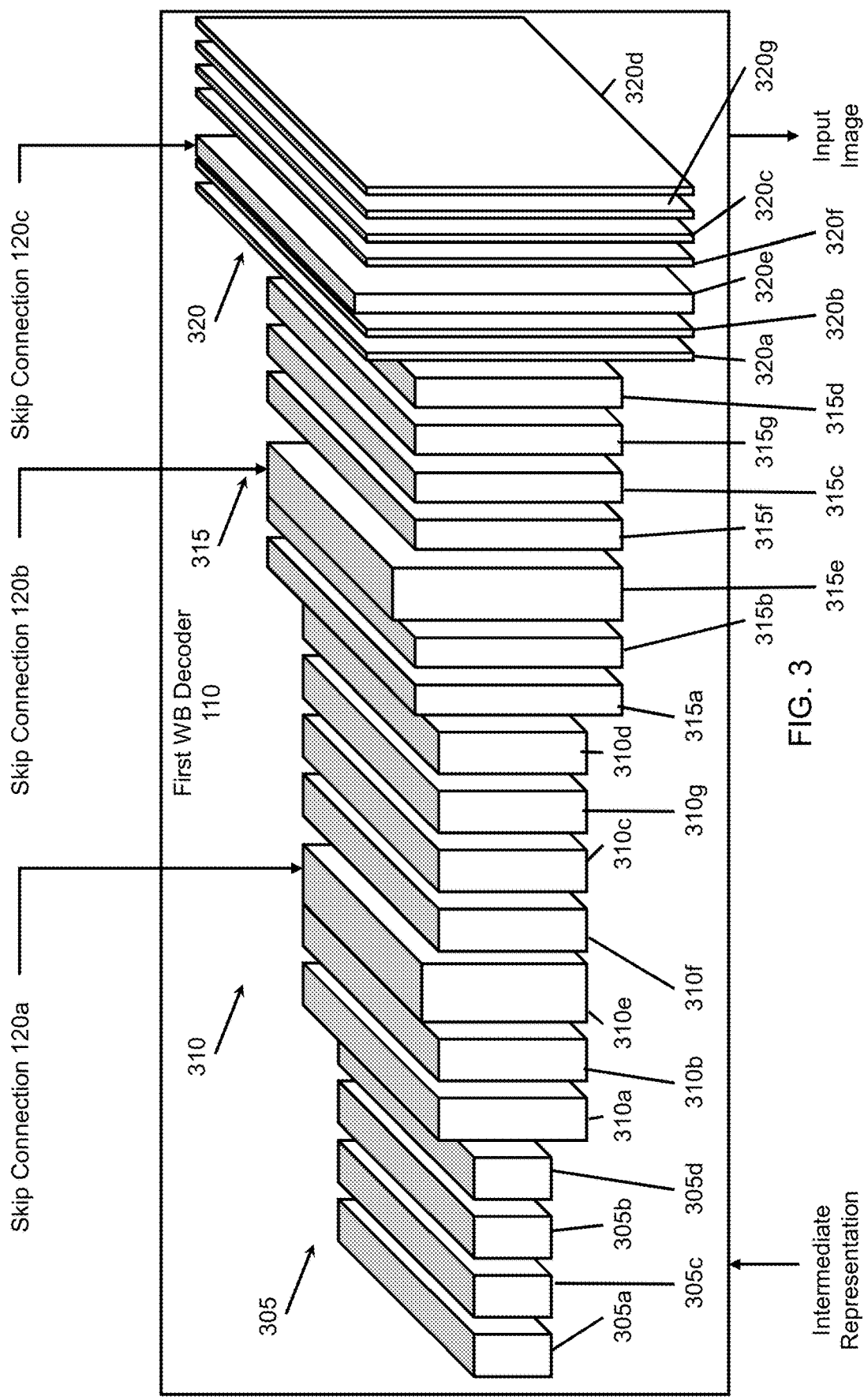
FIG. 3 is a block diagram of a first WB decoder of the apparatus for white balance editing of FIG. 1.

FIG. 3 is a block diagram of the first WB decoder 110 of the apparatus 100 for white balance editing of FIG. 1.

Referring to FIG. 3, the first WB decoder 110 includes a first level 305, a second level 310, a third level 315 and a fourth level 320. The intermediate representation may be transferred through each of layers of the first level 305, the second level 310, the third level 315 and the fourth level 320 to obtain the first output image.

The first level 305 may include ReLU layers 305a and 305b and 3×3 convolutional layers 305c and 305d with stride 1 and padding 1. The convolutional layer 305c may be interposed between the ReLU layers 305a and 305b, and the ReLU layer 305b may be interposed between the convolutional layers 305c and 305d. For example, each of the ReLU layers 305a and 305b and the convolutional layers 305c and 305d may have a size of 8×8×384.

The second level 310 may include a 2×2 upsampling layer 310a, 3×3 convolutional layers 310b, 310c and 310d with stride 1 and padding 1, a depth concatenation layer 310e and ReLU layers 310f and 310g. The layers of the second level 310 may be in an order of, from an input to an output, the upsampling layer 310a, the convolutional layer 310b, the depth concatenation layer 310e, the ReLU layer 310f, the convolutional layer 310c, the ReLU layer 310g and the convolutional layer 310d. For example, each of the upsampling layer 310a, the convolutional layers 310b, 310c and 310d and the ReLU layers 310f and 310g may have a size of 16×16×192, and the depth concatenation layer 310e may have a size of 16×16×384.

The third level 315 may include a 2×2 upsampling layer 315a, 3×3 convolutional layers 315b, 315c and 315d with stride 1 and padding 1, a depth concatenation layer 315e and ReLU layers 315f and 315g. The layers of the third level 315 may be in an order of, from an input to an output, the upsampling layer 315a, the convolutional layer 315b, the depth concatenation layer 315e, the ReLU layer 315f, the convolutional layer 315c, the ReLU layer 315g and the convolutional layer 315d. For example, each of the upsampling layer 315a, the convolutional layers 315b, 315c and 315d and the ReLU layers 315f and 315g may have a size of 64×64×48, and the depth concatenation layer 315e may have a size of 64×64×96.

The fourth level 320 may include a 2×2 upsampling layer 320a, 3×3 convolutional layers 320b, 320c and 320d with stride 1 and padding 1, a depth concatenation layer 320e, ReLU layers 320f and 320g and an 1×1 convolutional layer 320h with stride 1 and padding 1. The layers of the fourth level 320 may be in an order of, from an input to an output, the upsampling layer 320a, the convolutional layer 320b, the depth concatenation layer 320e, the ReLU layer 320f, the convolutional layer 320c, the ReLU layer 320g and the convolutional layer 320d and the convolutional layer 320h. For example, each of the upsampling layer 320a, the convolutional layers 320b, 320c and 320d and the ReLU layers 320f and 320g may have a size of 128×128×24, the depth concatenation layer 320e may have a size of 128×128×48, and the convolutional layer 320h may have a size of 128×128×3.

Figure 4:
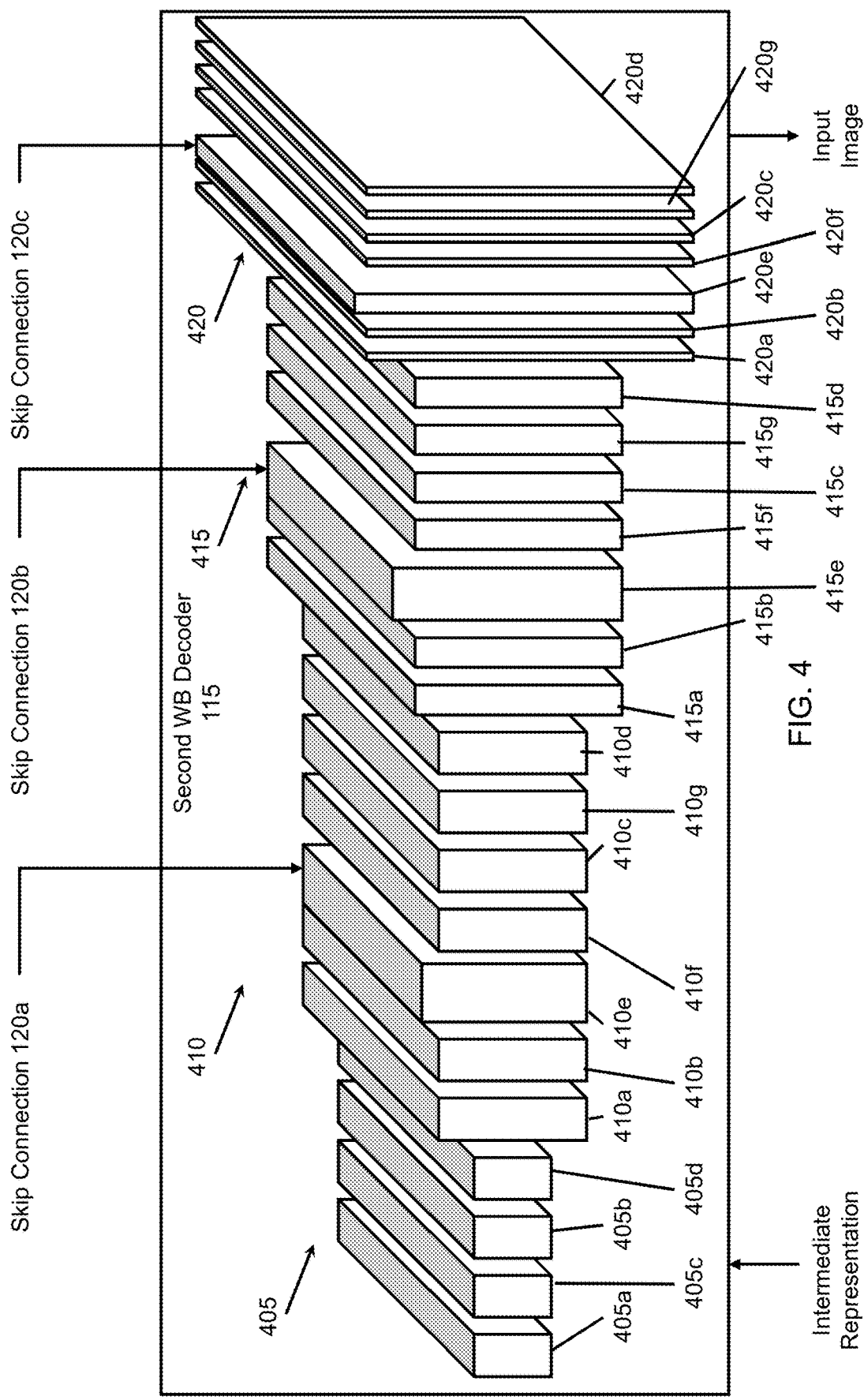
FIG. 4 is a block diagram of a second WB decoder of the apparatus for white balance editing of FIG. 1.

FIG. 4 is a block diagram of the second WB decoder 115 of the apparatus 100 for white balance editing of FIG. 1.

Referring to FIG. 4, the second WB decoder 115 includes a first level 405, a second level 410, a third level 415 and a fourth level 420. The intermediate representation may be transferred through each of layers of the first level 405, the second level 410, the third level 415 and the fourth level 420 to obtain the second output image.

The first level 405 may include ReLU layers 405a and 405b and 3×3 convolutional layers 405c and 405d with stride 1 and padding 1. The convolutional layer 405c may be interposed between the ReLU layers 405a and 405b, and the ReLU layer 405b may be interposed between the convolutional layers 405c and 405d. For example, each of the ReLU layers 405a and 405b and the convolutional layers 405c and 405d may have a size of 8×8×384.

The second level 410 may include a 2×2 upsampling layer 410a, 3×3 convolutional layers 410b, 410c and 410d with stride 1 and padding 1, a depth concatenation layer 410e and ReLU layers 410f and 410g. The layers of the second level 410 may be in an order of, from an input to an output, the upsampling layer 410a, the convolutional layer 410b, the depth concatenation layer 410e, the ReLU layer 410f, the convolutional layer 410c, the ReLU layer 410g and the convolutional layer 410d. For example, each of the upsampling layer 410a, the convolutional layers 410b, 410c and 410d and the ReLU layers 410f and 410g may have a size of 16×16×192, and the depth concatenation layer 410e may have a size of 16×16×384.

The third level 415 may include a 2×2 upsampling layer 415a, 3×3 convolutional layers 415b, 415c and 415d with stride 1 and padding 1, a depth concatenation layer 415e and ReLU layers 415f and 415g. The layers of the third level 415 may be in an order of, from an input to an output, the upsampling layer 415a, the convolutional layer 415b, the depth concatenation layer 415e, the ReLU layer 415f, the convolutional layer 415c, the ReLU layer 415g and the convolutional layer 415d. For example, each of the upsampling layer 415a, the convolutional layers 415b, 415c and 415d and the ReLU layers 415f and 415g may have a size of 64×64×48, and the depth concatenation layer 415e may have a size of 64×64×96.

The fourth level 420 may include a 2×2 upsampling layer 420a, 3×3 convolutional layers 420b, 420c and 420d with stride 1 and padding 1, a depth concatenation layer 420e, ReLU layers 420f and 420g and an 1×1 convolutional layer 420h with stride 1 and padding 1. The layers of the fourth level 420 may be in an order of, from an input to an output, the upsampling layer 420a, the convolutional layer 420b, the depth concatenation layer 420e, the ReLU layer 420f, the convolutional layer 420c, the ReLU layer 420g and the convolutional layer 420d and the convolutional layer 420h. For example, each of the upsampling layer 420a, the convolutional layers 420b, 420c and 420d and the ReLU layers 420f and 420g may have a size of 128×128×24, the depth concatenation layer 420e may have a size of 128×128×48, and the convolutional layer 420h may have a size of 128×128×3.

Referring to FIGS. 2-4, a skip connection 120a may connect the first level 205 of the encoder 105 with the fourth level 320 of the first WB decoder 110 and/or the fourth level 420 of the second WB decoder 115. A skip connection 120b may connect the second level 210 of the encoder 105 with the third level 315 of the first WB decoder 110 and/or the third level 415 of the second WB decoder 115. A skip connection 120c may connect the third level 215 of the encoder 105 with the second level 310 of the first WB decoder 110 and/or the second level 410 of the second WB decoder 115.

Figure 5:
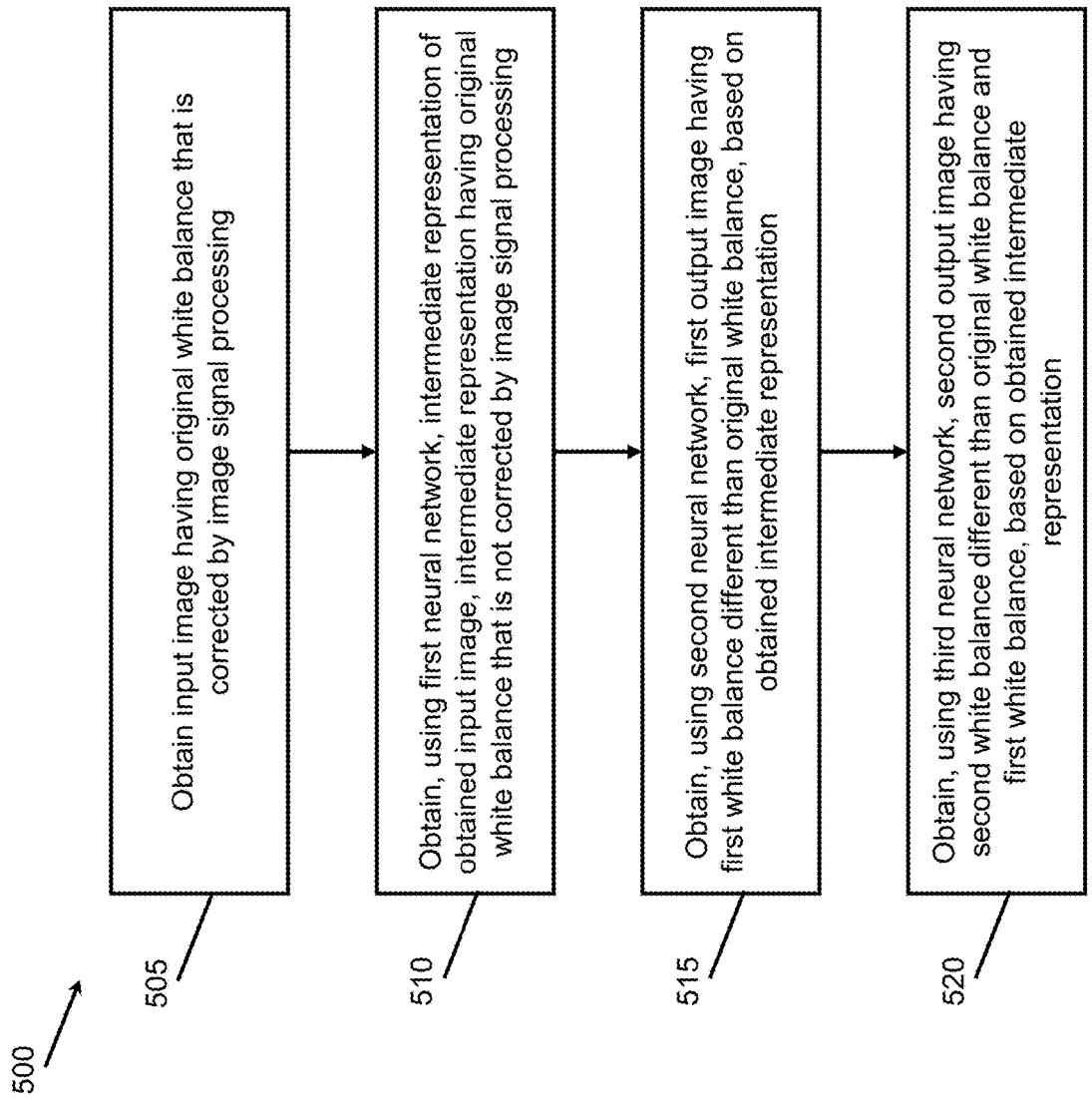
FIG. 5 is a flowchart of a method of white balance editing, according to embodiments.

FIG. 5 is a flowchart of a method 500 of white balance editing, according to embodiments.

The method 500 may be performed by at least one processor using the apparatus 100 for white balance editing of FIG. 1.

Referring to FIG. 5, in operation 505, the method 500 includes obtaining an input image having an original white balance that is corrected by image signal processing.

In operation 510, the method 500 includes obtaining, using a first neural network, an intermediate representation of the obtained input image, the intermediate representation having the original white balance that is not corrected by the image signal processing.

In operation 515, the method 500 includes obtaining, using a second neural network, a first output image having a first white balance different than the original white balance, based on the obtained intermediate representation.

In operation 520, the method 500 includes obtaining, using a third neural network, a second output image having a second white balance different than the original white balance and the first white balance, based on the obtained intermediate representation.

The method 500 may further include displaying a slider for selecting one among a plurality of white balances, and based on a user input of selecting the one among the plurality of white balances, using the displayed slider, displaying a result image having the selected one among the plurality of white balances, using any one or any combination of the obtained first output image, the obtained second output image and a blended image of the obtained first output image and the obtained second output image.

The at least one processor, the first neural network and the second neural network may be implemented in a server, and the method 500 may further include receiving, from an image signal processor of an electronic device, the input image having the original white balance corrected by the image signal processing of the image signal processor, and transmitting, to the electronic device, the obtained first output image.

Figure 6:
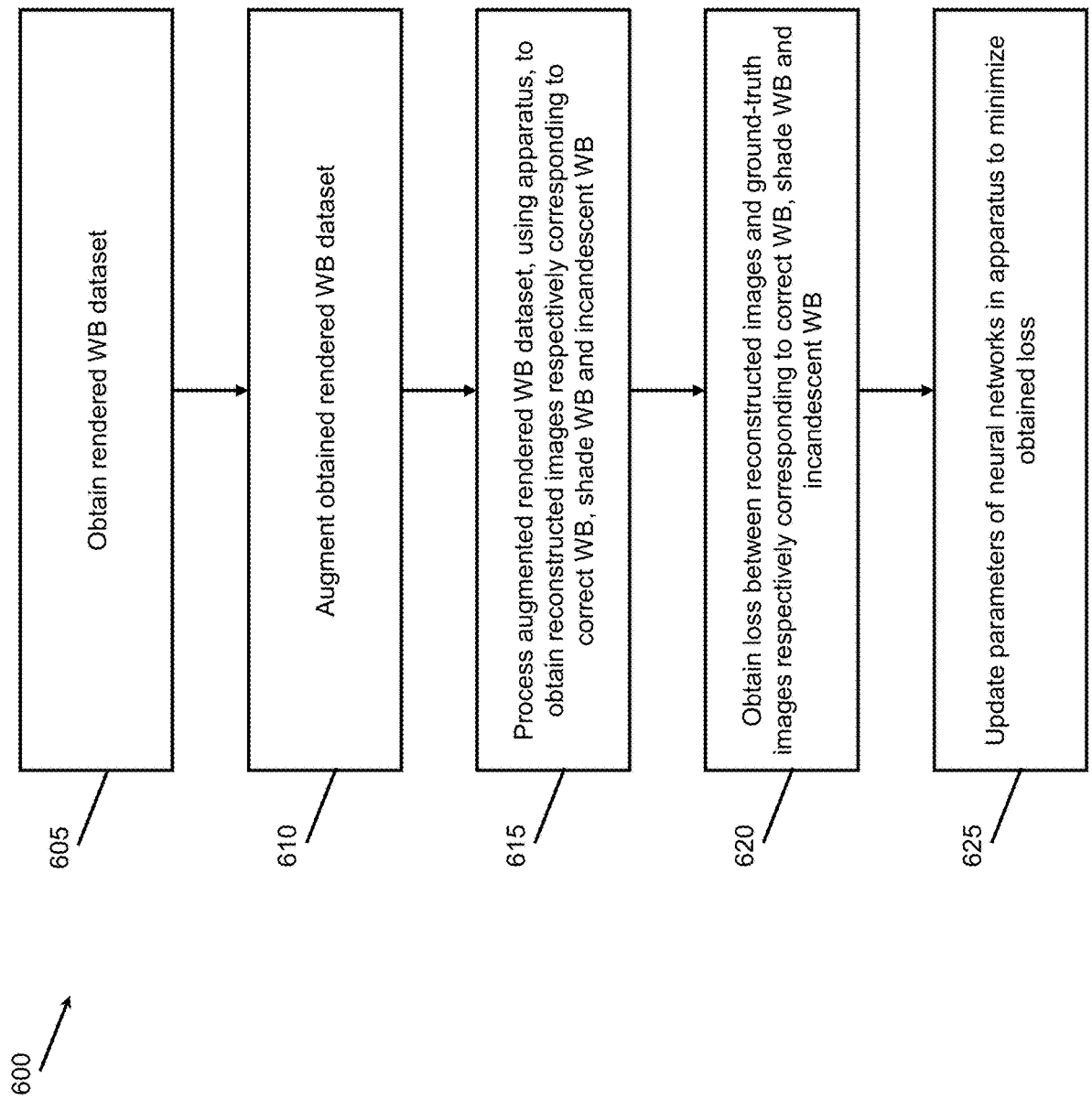
FIG. 6 is a flowchart of a method of training for white balance editing, according to embodiments.

FIG. 6 is a flowchart of a method 600 of training for white balance editing, according to embodiments.

The method 600 may be performed by at least one processor training the apparatus 100 for white balance editing of FIG. 1.

Referring to FIG. 6, in operation 605, the method 600 includes obtaining a rendered WB dataset. The rendered WB dataset is used to train and validate the apparatus 100 for white balance editing. This dataset may include ~65,000 sRGB images that are rendered by different camera models and with different WB settings, including shade and incandescent settings. For each image, there is also a corresponding ground-truth image that is rendered with a correct WB setting (i.e., considered to be a correct AWB result). This dataset includes two subsets: a training set (Set 1) and a testing set (Set 2). Three-fold cross-validation using Set 1 is performed to train and validate the apparatus 100. Specifically, 12,000 training images are randomly selected from two folds, and 2,000 validation images are randomly selected from a remaining fold. For each training image, three ground-truth images are rendered with (i) a correct WB (denoted as AWB), (ii) a shade WB, and (iii) an incandescent WB. The three models are trained by altering training and validation folds.

In operation 610, the method 600 includes augmenting the obtained rendered WB dataset. In detail, the training images are augmented by rendering an additional 1,029 raw-RGB images of the same scenes included in the rendered WB dataset, but with random color temperatures. At each epoch, four 128×128 patches are randomly selected from each of the training images and their corresponding ground-truth images, for each decoder. Geometric augmentation (rotation and flipping) is applied to the selected patches as an additional data augmentation to avoid overfitting.

In operation 615, the method 600 includes processing the augmented rendered WB dataset, using the apparatus 100, to obtain reconstructed images (patches) respectively corresponding to the correct WB, the shade WB and the incandescent WB.

In operation 620, the method 600 includes obtaining a loss between the reconstructed images and the ground-truth images (patches) respectively corresponding to the correct WB, the shade WB and the incandescent WB. For example, the apparatus 100 is trained to minimize a squared $L_2$-norm loss function between the reconstructed and ground-truth patches:

$$\tfrac{1}{2}\Sigma_i\Sigma_{p=1}^{3hw}(P_{WB_{(i)}}(p)-C_{WB_{(i)}}(p))^2 \qquad (3).$$

h and w denote a patch's width and height, and p indexes into each pixel of a training patch P and a ground-truth camera-rendered patch C, respectively. An index $i\in\{A, T, S\}$ refers to three target WB settings. Alternatively, an $L_1$-norm loss function may be used to train the apparatus 100.

In operation 625, the method 600 includes updating parameters of the neural networks in the apparatus 100 (e.g., the encoder 105, the first WB decoder 110 and the second WB decoder 115) to minimize the obtained loss. For example, weights of convolution layers of the apparatus 100 are initialized, and then a training process may be performed for 165,000 iterations, using an adaptive moment estimation (Adam) optimizer with a decay rate of a gradient moving average $\beta_1=0.9$ and a decay rate of a squared gradient moving average $\beta_2=0.999$. A learning rate of $10^{-4}$ may be used and reduced by 0.5 every 25 epochs. An $L_2$ regularization rate may be set to $10^{-5}$, and a mini-batch size may be 32 training patches per iteration.

Figure 7:
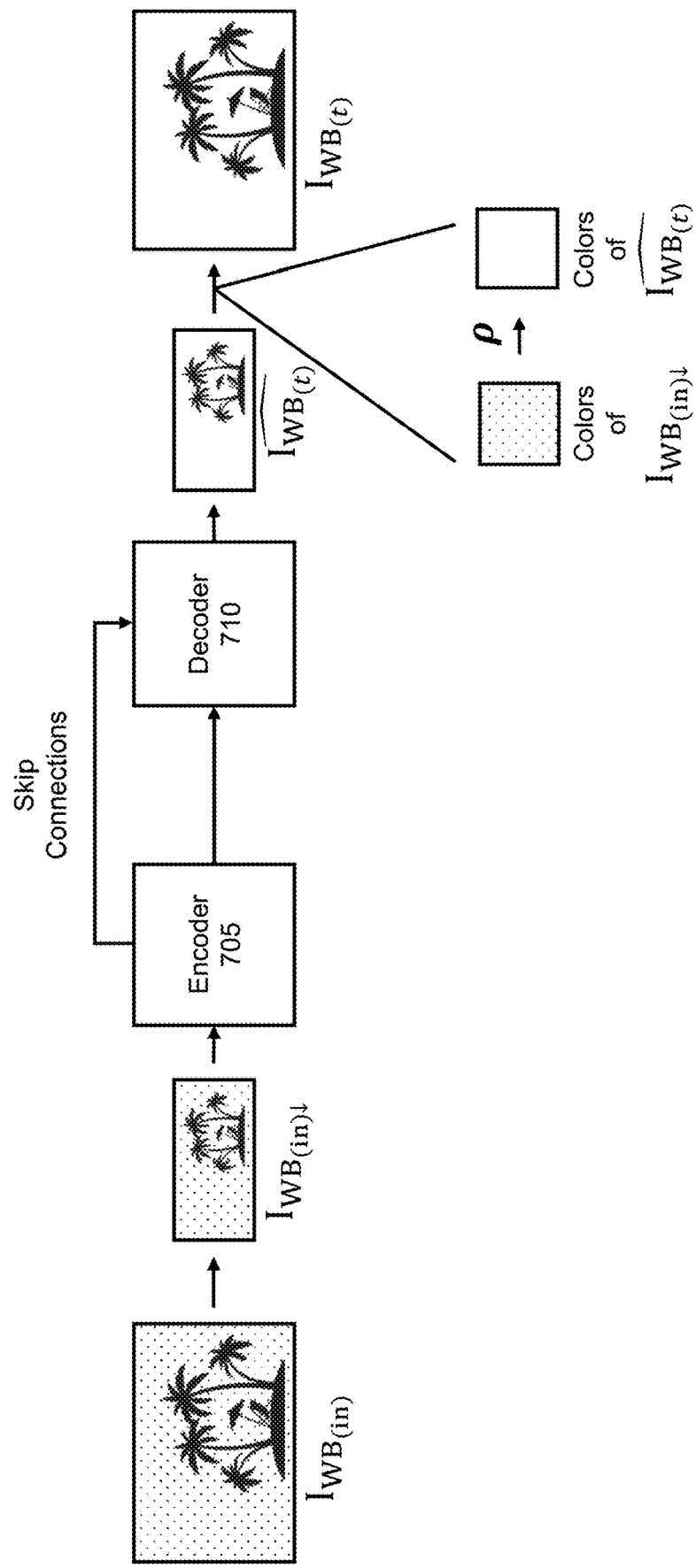
FIG. 7 is a diagram of a color mapping procedure in a method of white balance editing, according to embodiments.

FIG. 7 is a diagram of a color mapping procedure in a method of white balance editing, according to embodiments.

A DNN model according to embodiments is a fully convolutional network and is able to process input images in their original dimensions with a restriction that dimensions should be a multiple of $2^4$ as 4-level encoder/decoders with 2×2 max-pooling and upsampling layers are used.

However, to ensure a consistent run time for any-sized input images, all input images may be resized to a maximum dimension of 656 pixels. The DNN model is applied on these resized images. Then, a color mapping function between the resized input images and output images is computed, and this color mapping function is applied to full-size input images.

Referring to FIG. 7, given an input image $I_{WB_{(i)}}$ (h×w pixels) and a corresponding output image $\hat{I}_{WB_{(i)}}$ (h'×w' pixels) that is generated from an encoder 705 and one of decoders (e.g., a decoder 710), where h'≤h' and w'≤w, the color mapping procedure aims to produce $I_{WB_{(i)}}$ in an original input image's resolution (i.e., h×w×3 pixels). A polynomial function based on a mapping matrix ρ that globally maps colors of a downsampled input image $I_{WB_{(in)}}$ to colors of the generated output image $\hat{I}_{WB_{(i)}}$ is adopted. For example, the mapping matrix ρ can be computed in a closed-form solution as follows:

$$\rho=(S^TS)^{-1}S^TY \qquad (4).$$

$S=h(r(I_{WB_{(in)}}))$, $Y=r(I_{WB_{(i)}})$, $r:I^{(h\times w\times 3)}\to I^{(hw\times 3)}$ is a reshape function that constructs $I^{(hw!\times 3)}$ from $I^{(h\times w\times 3)}$, and $h:I^{(hw\times 3)}\to I^{(hw\times n)}$ is a polynomial kernel function that maps RGB vectors of an image to a higher n-dimensional space. For example, a 11-dimensional polynomial mapping may be used.

Once the mapping matrix ρ is computed, a final result in the same input image resolution may be computed using the following equation:

$$I_{WB_{(i)}}=r^{-1}(\rho h(r(I_{WB_{(in)}}))) \qquad (5).$$

Figure 8:
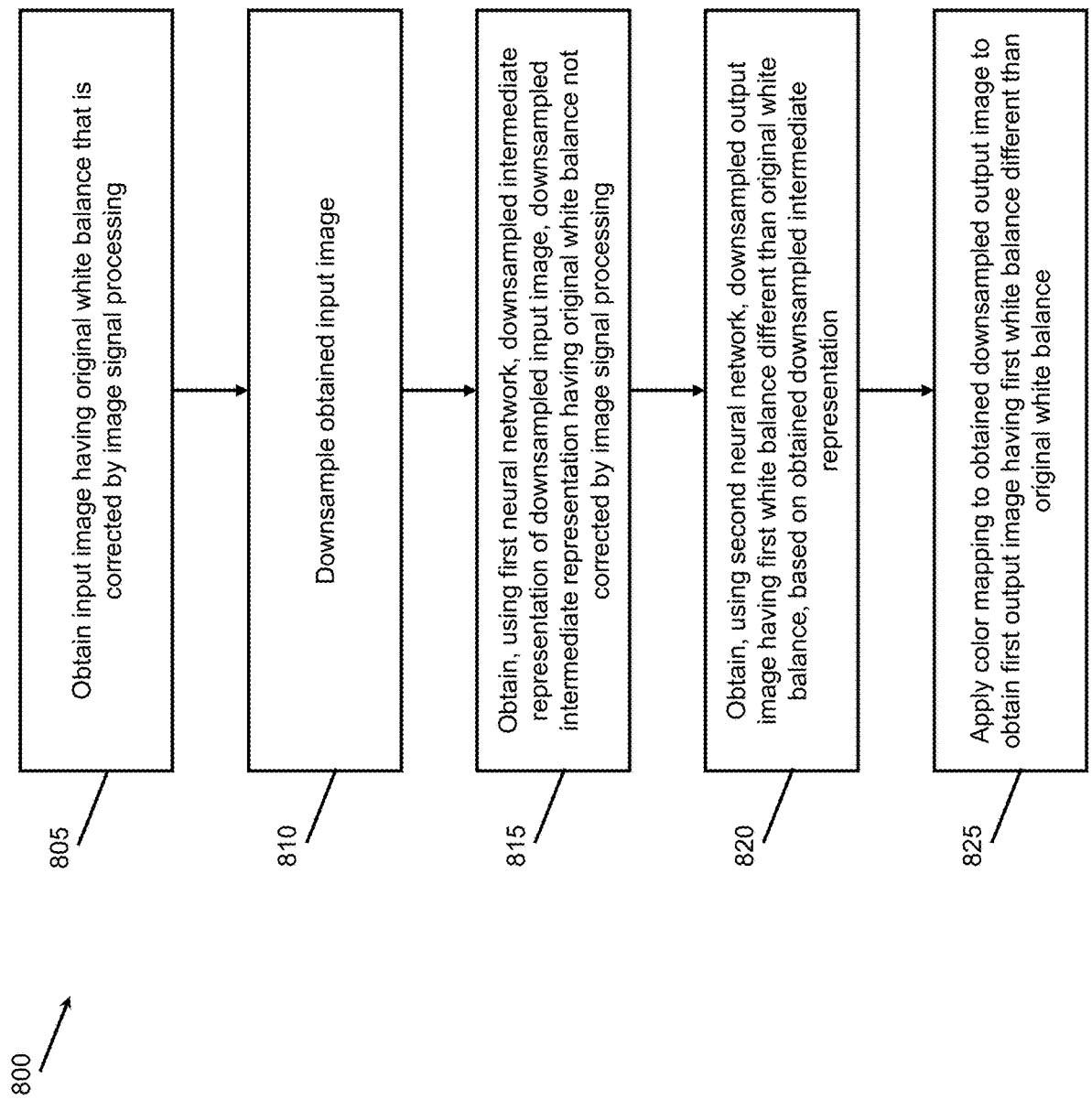
FIG. 8 is a flowchart of a method of white balance editing, according to other embodiments.

FIG. 8 is a flowchart of a method 800 of white balance editing, according to other embodiments.

The method 800 may be performed by at least one processor using the apparatus 100 for white balance of FIG. 1.

In operation 805, the method 800 includes obtaining an input image having an original white balance that is corrected by image signal processing.

In operation 810, the method 800 includes downsampling the obtained input image.

In operation 815, the method 800 includes obtaining, using a first neural network, a downsampled intermediate representation of the downsampled input image, the downsampled intermediate representation having the original white balance not corrected by the image signal processing.

In operation 820, the method 800 includes obtaining, using a second neural network, a downsampled output image having a first white balance different than the original white balance, based on the obtained downsampled intermediate representation.

In operation 825, the method 800 includes applying a color mapping to the obtained downsampled output image to obtain a first output image having the first white balance different than the original white balance.

Figure 9:
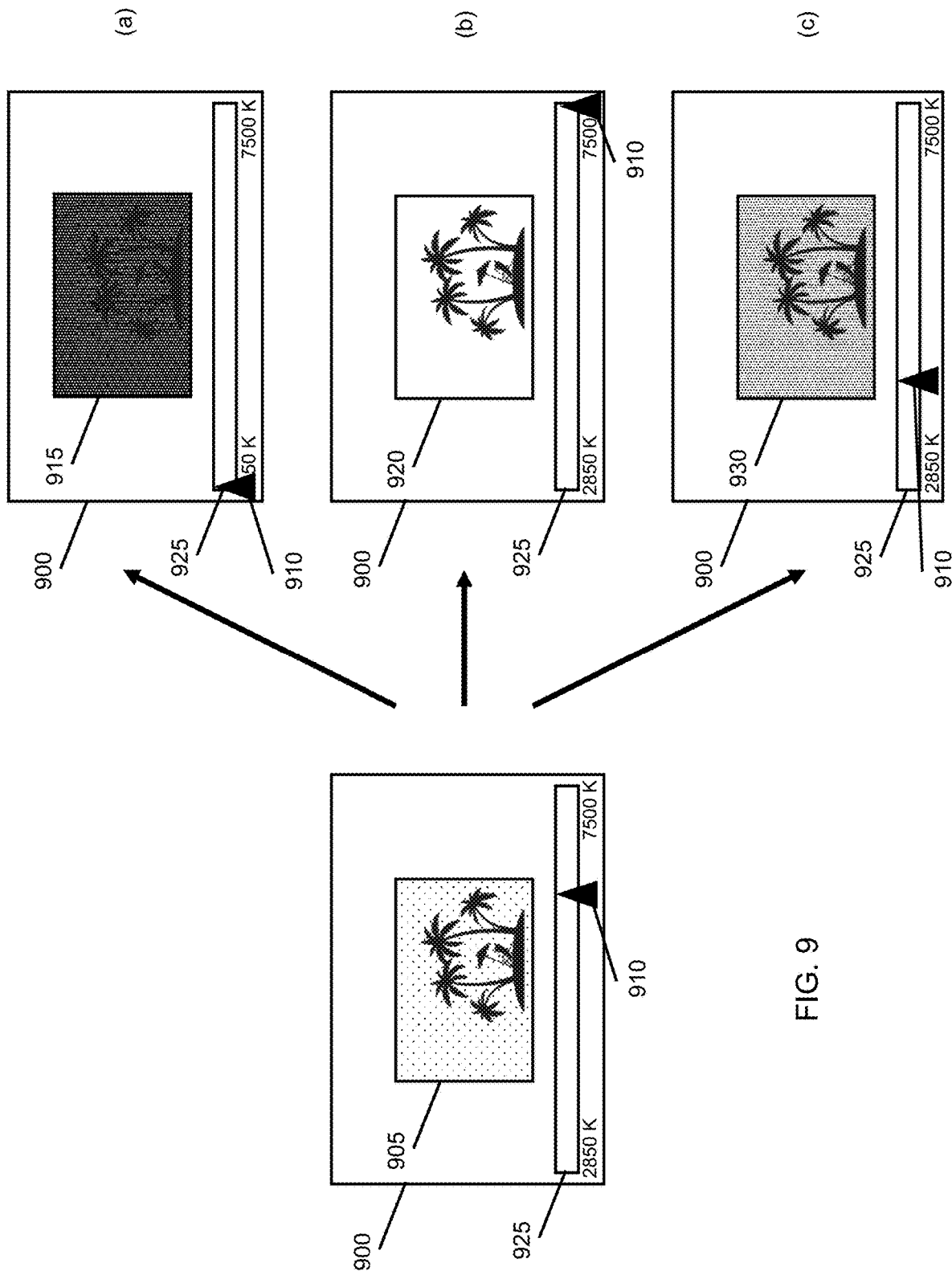
FIG. 9 is a diagram of an user interface for white balance editing, according to embodiments.

FIG. 9 is a diagram of an user interface 900 for white balance editing, according to embodiments.

The user interface 900 shows an input image 905 and a slider 910 that allows a user to choose between generating any of output images respectively with, e.g., three available WB settings, for example, an AWB setting, a shade WB setting, and an incandescent WB setting. For example, a first output image 915 having an incandescent WB (2850 K) or a second output image 920 having a shade WB (7500 K) may be generated and shown in the user interface 900 of portions (a) and (b) of FIG. 9, respectively. The slider 910 may be in a range 925 of Kelvin, e.g., from 2850 K to 7500 K, and the user may select any value of Kelvin in the range 925 by sliding the slider 910 to the selected value. Based on a user input selecting the value, the user interface 900 may show an output image corresponding to the selected value.

Using the shade and incandescent WB settings, and the value selected by the user in the range 925, the user can further edit the input image 905 to be a third output image 930 having a specific WB (e.g., 3500K) in terms of color temperature, not the shade WB or the incandescent WB, as shown in portion (c) of FIG. 9. To produce an effect of a new target WB setting with a color temperature t, which is not produced by one of decoders (e.g., the first WB decoder 110), interpolation between the generated first and second output images 915 and 920 respectively with the incandescent and shade WB settings can be performed. This operation may be described by the following equation:

$$I_{WB_{(t)}} = bI_{WB_{(T)}} + (1-b)I_{WB_{(S)}} \quad (6).$$

$I_{WB_{(T)}}$ and $I_{WB_{(S)}}$ are the generated first and second output images 915 and 920 respectively with the incandescent and shade WB settings, and b is an interpolation ratio that is given by $$\frac{1/t - 1/t(S)}{1/t(T) - 1/t(S)}.$$

The user interface 900 may be implemented in a user application that is installed on an electronic device, e.g., a mobile device. The user application may be for editing a WB of an image after it is captured by a camera of the electronic device and processed by an image signal processor of the electronic device. The user application may be part of a gallery editing service.

Figure 10:
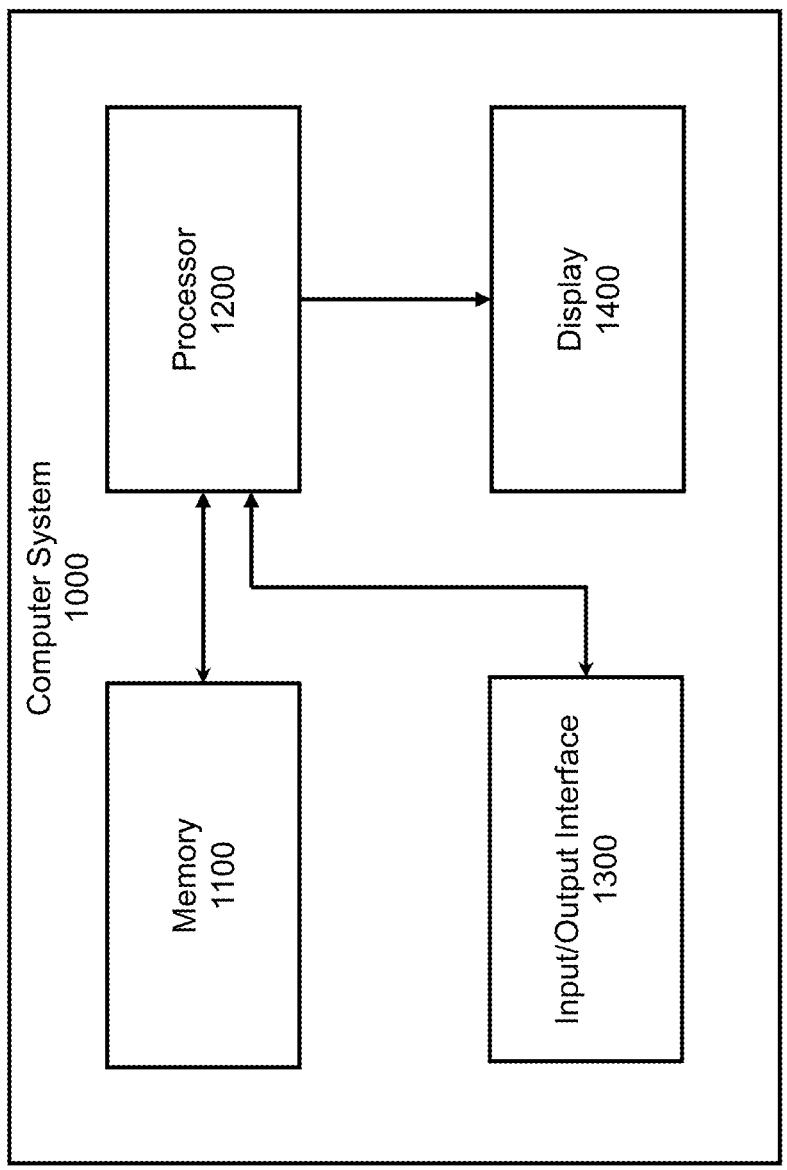
FIG. 10 is a block diagram of a computer system according to embodiments.

FIG. 10 is a block diagram of a computer system 1000 according to embodiments.

As shown in FIG. 10, the computer system 1000 may include a processor 1100, a memory 1200, an input/output interface 1300 and a display 1400.

The computer system 1000 may be implemented in an electronic device (e.g., a mobile device) and/or a server.

The processor 1100 may perform overall control of the apparatus 100 for white balance editing of FIG. 1, and may execute one or more programs stored in the memory 1200. The processor 1100 is implemented in hardware, firmware, or a combination of hardware and software. The processor 1100 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 1100 includes one or more processors capable of being programmed to perform a function.

The processor 1100 according to embodiments of the disclosure may perform any one or any combination of operations using the encoder 105, the first WB decoder 110 and the second WB decoder 115, which are described with reference to FIGS. 1-9.

The memory 1200 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory 1200 may also include a random access memory (RAM), a read only memory (ROM), and/or another type of dynamic or static storage device (e.g., a flash memory, a magnetic memory, and/or an optical memory).

The memory 1200 may store various data, programs, or applications for driving and controlling the apparatus 100. A program stored in the memory 1200 may include one or more instructions. A program including one or more instructions or an application stored in the memory 1200 may be executed by the processor 1100.

The input/output interface 1300 may enable the computer system 1000 to communicate with other devices, such as, for example, another electronic device and another server, via a wired connection, a wireless connection, or a combination of wired and wireless connections. For example, if the apparatus 100 and the computer system 1000 are implemented in a server, the processor 1100 may receive, via the input/output interface 1300, from an image signal processor of an electronic device, an input image having an original white balance that is corrected by an image signal processing of the image signal processor. The processor 1100 may further transmit, via the input/output interface 1300, to the electronic device, an output image having a white balance different than the original white balance.

The display 1400 may obtain data from, e.g., the processor 1100, and may display the obtained data. The display 1400 may include, for example, a touchscreen, a television, a computer monitor or any combination thereof.

According to the embodiments of the present disclosure, a deep learning framework for WB editing is presented. The framework accurately corrects WBs of incorrectly white-balanced images. In addition, the framework provides a user the freedom to edit a WB in an sRGB image to other illumination settings. The framework includes a single encoder and a multi-decoder. The multi-decoder model is trained to produce multiple WB settings in an end-to-end manner. The framework achieves state-of-the-art results for WB correction and manipulation, and produces more efficient compiling results compared with prior work for WB correction and manipulation.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for white balance editing, the apparatus comprising:
    a memory storing instructions; and
    at least one processor configured to execute the instructions to:
    obtain an input image having a corrected white balance that is obtained by correcting an original white balance via image signal processing;
    obtain, using a first neural network, an intermediate representation of the obtained input image, the intermediate representation having the original white balance that is not corrected by the image signal processing; and
    obtain, using a second neural network, a first output image having a first white balance different than the original white balance, based on the obtained intermediate representation.

2. The apparatus of claim 1, wherein the at least one processor is further configured to execute the instructions to obtain, using a third neural network, a second output image having a second white balance different than the original white balance and the first white balance, based on the obtained intermediate representation.

3. The apparatus of claim 2, wherein the at least one processor is further configured to execute the instructions to:
    control to display a slider for selecting one among a plurality of white balances; and
    based on a user input of selecting the one among the plurality of white balances, using the displayed slider, control to display a result image having the selected one among the plurality of white balances, using any one or any combination of the obtained first output image, the obtained second output image and a blended image of the obtained first output image and the obtained second output image.

4. The apparatus of claim 1, wherein the at least one processor is further configured to execute the instructions to:
    downsample the obtained input image;
    obtain, using the first neural network, a downsampled intermediate representation of the downsampled input image, the downsampled intermediate representation having the original white balance not corrected by the image signal processing;
    obtain, using the second neural network, a downsampled output image having the first white balance different than the original white balance, based on the obtained downsampled intermediate representation; and
    apply a color mapping to the obtained downsampled output image to obtain the first output image having the first white balance different than the original white balance.

5. The apparatus of claim 4, wherein the color mapping is a polynomial function based on a mapping matrix that maps colors of the downsampled input image to colors of the downsampled output image.

6. The apparatus of claim 1, wherein the first neural network comprises:
    one or more first convolutional layers, one or more first rectified linear unit (ReLU) layers and at least one first max-pooling layer; and
    one or more second convolutional layers, one or more second ReLU layers and at least one second max-pooling layer, and
    a second number of channels of each of the one or more second convolutional layers, the one or more second ReLU layers and the at least one second max-pooling layer is doubled a first number of channels of each of the one or more first convolutional layers, the one or more first ReLU layers and the at least one first max-pooling layer.

7. The apparatus of claim 1, wherein the apparatus, the first neural network and the second neural network are implemented in a server, and
    the at least one processor is further configured to execute the instructions to:
    receive, from an image signal processor of an electronic device, the input image having the corrected white balance; and
    transmit, to the electronic device, the obtained first output image.

8. A method of white balance editing, the method being performed by at least one processor and comprising:
    obtaining an input image having a corrected white balance that is obtained by correcting an original white balance via image signal processing;
    obtaining, using a first neural network, an intermediate representation of the obtained input image, the intermediate representation having the original white balance that is not corrected by the image signal processing; and
    obtaining, using a second neural network, a first output image having a first white balance different than the original white balance, based on the obtained intermediate representation.

9. The method of claim 8, further comprising obtaining, using a third neural network, a second output image having a second white balance different than the original white balance and the first white balance, based on the obtained intermediate representation.

10. The method of claim 9, further comprising:
    displaying a slider for selecting one among a plurality of white balances; and
    based on a user input of selecting the one among the plurality of white balances, using the displayed slider, displaying a result image having the selected one among the plurality of white balances, using any one or any combination of the obtained first output image, the obtained second output image and a blended image of the obtained first output image and the obtained second output image.

11. The method of claim 8, further comprising:
    downsampling the obtained input image;
    obtaining, using the first neural network, a downsampled intermediate representation of the downsampled input image, the downsampled intermediate representation having the original white balance not corrected by the image signal processing;

obtaining, using the second neural network, a downsampled output image having the first white balance different than the original white balance, based on the obtained downsampled intermediate representation; and applying a color mapping to the obtained downsampled output image to obtain the first output image having the first white balance different than the original white balance.

12. The method of claim 11, wherein the color mapping is a polynomial function based on a mapping matrix that maps colors of the downsampled input image to colors of the downsampled output image.

13. The method of claim 8, wherein the first neural network comprises:
one or more first convolutional layers, one or more first rectified linear unit (ReLU) layers and at least one first max-pooling layer; and
one or more second convolutional layers, one or more second ReLU layers and at least one second max-pooling layer, and
a second number of channels of each of the one or more second convolutional layers, the one or more second ReLU layers and the at least one second max-pooling layer is doubled a first number of channels of each of the one or more first convolutional layers, the one or more first ReLU layers and the at least one first max-pooling layer.

14. The method of claim 8, wherein the at least one processor, the first neural network and the second neural network are implemented in a server, and
the method further comprises:
receiving, from an image signal processor of an electronic device, the input image having the corrected white balance; and
transmitting, to the electronic device, the obtained first output image.

15. A non-transitory computer-readable storage medium storing instructions that, when executed by at least one processor for white balance editing, cause the at least one processor to:
obtain an input image having a corrected white balance that is obtained by correcting an original white balance via image signal processing;
obtain, using a first neural network, an intermediate representation of the obtained input image, the intermediate representation having the original white balance that is not corrected by the image signal processing; and
obtain, using a second neural network, a first output image having a first white balance different than the original white balance, based on the obtained intermediate representation.

16. The non-transitory computer-readable storage medium of claim 15, wherein the instructions further cause the at least one processor to obtain, using a third neural network, a second output image having a second white balance different than the original white balance and the first white balance, based on the obtained intermediate representation.

17. The non-transitory computer-readable storage medium of claim 16, wherein the instructions further cause the at least one processor to:
control to display a slider for selecting one among a plurality of white balances; and
based on a user input of selecting the one among the plurality of white balances, using the displayed slider, control to display a result image having the selected one among the plurality of white balances, using any one or any combination of the obtained first output image, the obtained second output image and a blended image of the obtained first output image and the obtained second output image.

18. The non-transitory computer-readable storage medium of claim 15, wherein the instructions further cause the at least one processor to:
downsample the obtained input image;
obtain, using the first neural network, a downsampled intermediate representation of the downsampled input image, the downsampled intermediate representation having the original white balance not corrected by the image signal processing;
obtain, using the second neural network, a downsampled output image having the first white balance different than the original white balance, based on the obtained downsampled intermediate representation; and
apply a color mapping to the obtained downsampled output image to obtain the first output image having the first white balance different than the original white balance.

19. The non-transitory computer-readable storage medium of claim 18, wherein the color mapping is a polynomial function based on a mapping matrix that maps colors of the downsampled input image to colors of the downsampled output image.

20. The non-transitory computer-readable storage medium of claim 15, wherein the first neural network comprises:
one or more first convolutional layers, one or more first rectified linear unit (ReLU) layers and at least one first max-pooling layer; and
one or more second convolutional layers, one or more second ReLU layers and at least one second max-pooling layer, and
a second number of channels of each of the one or more second convolutional layers, the one or more second ReLU layers and the at least one second max-pooling layer is doubled a first number of channels of each of the one or more first convolutional layers, the one or more first ReLU layers and the at least one first max-pooling layer.

* * * * *